United States Patent

Bretschneider et al.

[15] 3,636,761

[45] Jan. 25, 1972

[54] MOTOR CUTOFF AND DELAYED REVERSING CIRCUIT FOR A RECORDING AND PLAYBACK APPARATUS

[72] Inventors: Hermann Bretschneider; Viktor Czonka; Karl Rupp, all of Vienna, Austria

[73] Assignee: U.S. Philips Corporation, New York, N.Y.

[22] Filed: Jan. 29, 1970

[21] Appl. No.: 6,857

[30] Foreign Application Priority Data

Jan. 31, 1969 Austria ................................A981/69

[52] U.S. Cl. ......................................................179/100.2 S

[51] Int. Cl. ......................................................G11b 15/06

[58] Field of Search................179/100.2 S, 100.3 D; 226/49, 226/50, 51; 242/186, 188

[56] References Cited

UNITED STATES PATENTS

| | | | |
|---|---|---|---|
| 3,270,930 | 9/1966 | Emerson | 266/49 |
| 3,199,801 | 8/1965 | Svendsen | 242/186 |
| 3,103,318 | 9/1963 | Van Duyne | 242/188 |

*Primary Examiner*—Terrell W. Fears
*Assistant Examiner*—Jay P. Lucas
*Attorney*—Frank R. Trifari

[57] ABSTRACT

A reversing apparatus for recording and playback devices where a group of multivibrators, logic circuits, and delay elements operate to stop the motor of the recording and playback device, and after a delay sufficient to ensure that all inertial movement has stopped reverses the motor.

4 Claims, 2 Drawing Figures

PATENTED JAN 25 1972

3,636,761

INVENTORS
HERMANN BRETSCHNEIDER
VIKTOR CZONKA
KARL RUPP
BY

AGENT

MOTOR CUTOFF AND DELAYED REVERSING CIRCUIT FOR A RECORDING AND PLAYBACK APPARATUS

The invention relates to a recording and/or playback apparatus having magnetically switched modes of tape movement, the record carrier (tape) having at least one mark supplying a signal for controlling a stop member and a switching member for controlling the direction of movement of the record carrier. In such apparatus the movement of the record carrier can be automatically stopped and, if desired, converted into the opposite direction of movement when the mark becomes operative.

According to the invention in an apparatus of the kind set forth the switching member is actuated after the response of the stop member by means of a storage circuit including a first bistable circuit element whose setting input receives the signal supplied from the mark and whose output is connected via a first signal-delaying member having a time lag at least equal to the running-out time of the tape movement, to the setting input of a second bistable circuit element, the output of which is connected an input of an OR gate, to the output of which the switching member is connected, while for switching off the tape movement after the actuation of the switching member at the disappearance of the signal from the mark the output of the second bistable circuit element has furthermore connected to the setting input of a third bistable circuit element whose output is connected to an input of an AND gate whose second input is connected to the setting input of the first bistable circuit element, while the output of the AND gate has connected to it the second input of the OR gate and the reset input of the second bistable circuit element and for resetting the storage circuit after the tape movement has been switched off the reset inputs of the first and third bistable circuits elements receive a resetting signal via a resetting member.

By these measures a special automatic final stop of the tape movement is obtained, in which in one direction of tape movement the signal from the tape mark results in stopping of this tape movement, after which at the termination of the tape run in this direction the mode of movement is switched on in the opposite direction until the marking signal disappears during the tape movement in this opposite direction. This final stop cycle is performed independently of the fact whether during the runout of the tape movement the marking signal disappears transiently or remains constantly operative.

Such a recording and/or playback apparatus is very suitable for the use of tape magazines in which the record carrier is not rigidly fixed by its ends to the winding cores in the magazine, since loosening of the tape is avoided with certainty by the measures in accordance with the invention. This also applies of course to the use of normal tape spools in an apparatus in accordance with the invention. If a tape section is provided with marks at the beginning and at the end, such an apparatus can be constantly ready for operation between these two tape marks. A further advantage resides in that tape marks of highly different lengths may be used without having to regard prescriptions with respect to minimum or maximum duration of their operation.

For producing the signal for resetting the storage circuit after the tape movement is switched off it has been found to be advantageous on account of the special simplicity to provide as resetting members switches adapted to be actuated by the control members for the modes of tape movements, through which switches the resetting inputs of the first and third bistable circuit elements receive as resetting signals a switching voltage preferably passed across a second signal-delaying member having a delay equal to the time interval between the response of the stop member and the instant of switching off of the tape movement after actuation of the switching member. Thus when any desired mode of tape movement is switched on the storage circuit is invariably reset to its initial state so that it is ready for controlling a new switching off cycle.

Resetting of the storage circuit may advantageously be performed automatically immediately at the termination of the switching-off cycle by having the resetting member formed by a differentiating circuit whose input is connected to the output of the OR gate and whose output supplies a pulse as a resetting signal at the termination of the actuation of the switching member.

In a recording and/or playback apparatus in which the stop member, when actuated, prevents switching on of a tape movement it has furthermore been found to be efficient to connect the stop member to the output of the first bistable circuit element. In this way unintentional starting of a mode of tape movement by means of a control member is definitely prevented until the termination of the switching-off cycle.

The invention will now be described more fully with reference to the drawing, which shows two embodiments, to which the invention is, however, not restricted.

Figure 1:
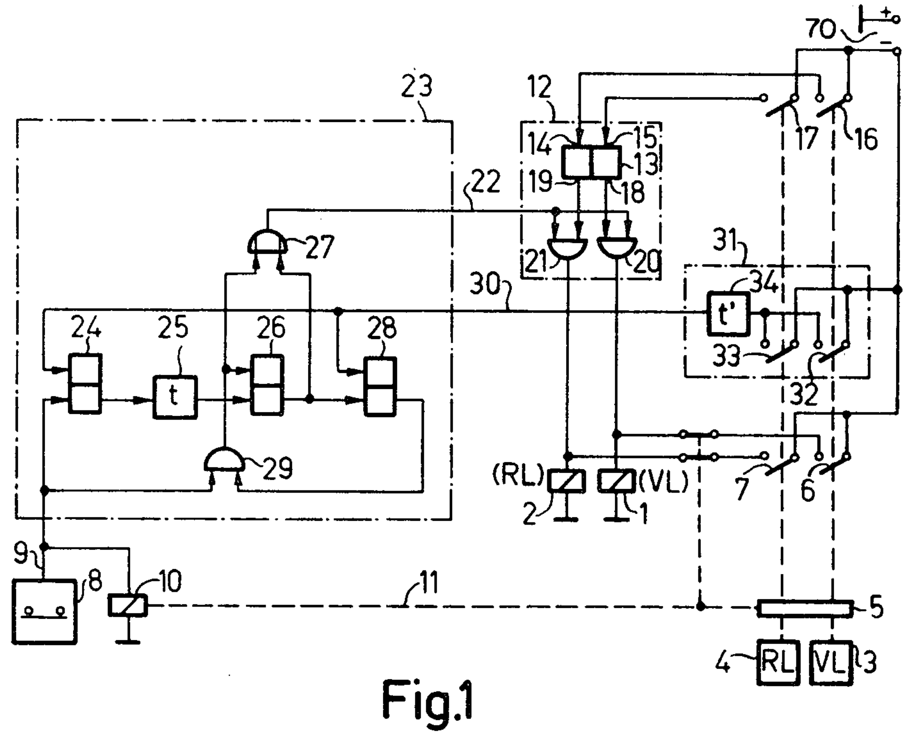
FIG. 1 shows a diagram of the essential parts for the invention of a first embodiment of a recording and/or playback apparatus in which the storage circuit is reset at the actuation of the control members for switching on the tape movements.

Referring to the drawing, reference numeral 1 designates a relay for switching on the "forward" tape movement (VL) and 2 a relay for switching on the "reverse" tape movement (RL). For switching on the relays 1, 2 the apparatus is provided with control members 3, 4, for example, in the form of pushbuttons, whose stop and locking mechanism not shown in detail is designated by 5; the control members 3, 4 are capable of actuating contacts 6, 7 through which the voltage from a voltage source 70 can be applied to the corresponding relay.

Reference numeral 8 designates a device not shown in detail for supplying the marking signal, from which device the signal supplied by the tape mark can be derived via the conductor 9. This device 8 may be constructed in known manner in quite different forms in accordance with the type of marks used on the tape. For example, the marking signal may be produced by optical, magnetic, or electric agency. The manner of production of this signal is not essential for the operation of the apparatus in accordance with the invention. This specification is based on a device 8 in which the marking signal is produced by the closure of contacts by means of a conductive marking foil on the tape, the signal appearing as a positive switching voltage across the conductor 9.

In the embodiment shown in FIG. 1 the conductor 9 has connected to it a relay 10, which forms part of a stop member adapted to cooperate, for example, as is indicated by the broken line 11, with the stop and locking member 5 and, as the case may be, with break-contacts connected in series with the make-contacts 6, 7. In known manner the energization of the relay 10 releases a depressed button 3, 4, so that a mode of movement switched on is stopped.

Reference numeral 12 denotes a switching member for the direction of movement of the tape, which member comprises a bistable circuit element 13 which serves as a so-called direction storage. This direction storage 13 is set, when a mode of movement is switched on, in a switching state characteristic of the direction of movement, and it remains in this state even when the mode of movement is switched off until the opposite direction of movement is switched on, as a result of which the direction storage changes over to the other switching state. For this purpose the bistable circuit element 13 has two setting inputs 14, 15, which receive from the voltage source 7 control signals via make-contacts 16, 17 actuated by the control members 3, 4. The direction storage 13 is constructed so that a switching voltage appears at its output 18 when the "reverse" movement is switched on by the actuation of the reverse movement button 4, whereas a switching voltage appears at its output 19 when the "forward" movement is switched on by the actuation of the forward movement button 3. The outputs 18 and 19 of the direction storage 13 are each connected to one of the inputs of two AND-gates 20 and 21 respectively. The output of the AND-gate 20 is connected to the energizing winding of the relay 1 and that of the AND-gate 21 is connected to the energizing winding of the relay 2. The second inputs of each of the AND-gates 20, 21 are connected to each other. To these inputs a control voltage can be applied via a conductor 22, which will be described more fully hereinafter so that either the relay 1 or the relay 2 can be energized. Thus a switching voltage for the relay 1 or 2 invariably appears at the output of each AND-gate 20 and 21 respectively whose input connected to the direction storage 13 also has a switching voltage which is associated with the direction of the tape movement prior to the appearance of the control voltage across the conductor 22. The switching voltage from the outputs of the AND gates is applied to the relay 1 or 2 respectively for switching on the direction of movement opposite the stored direction of movement. In this way at the appearance of a control voltage across the conductor 22 the direction of tape movement is invariably reversed with respect to a direction of movement switched on previously by the control members 3, 4.

According to the invention a storage circuit 23 is provided for supplying the aforesaid control voltage for actuating the switching member 12, the input of which store is connected by way of the conductor 9 to the device 8 for supplying the marking signal and the output of which store is connected by way of the conductor 22 to the switching member 12.

The storage circuit 23 comprises a first bistable circuit element 24, the setting input of which receives the marking signal via the conductor 9 and whose output is connected through a first signal-delaying member 25 to the setting input of a second bistable circuit element 26, to the output of the latter being connected an input of an OR-gate 27, to the output of which is connected the switching member 12 via the conductor 22. The output of the second bistable circuit element 26 is connected furthermore to the setting input of a third bistable circuit element 28, the output of which is connected to an input of an AND-gate 29, the second input of which is connected to the setting input of the first bistable circuit element 24, while the output of the AND-gate 29 has connected to it the second input of the OR-gate 27 and the resetting input of the second bistable circuit element 26. The resetting inputs of the first and third bistable circuit elements 24 and 28 respectively are connected to a conductor 30 for the supply of a signal from a resetting member 31. It is assumed herein that setting and resetting of the bistable circuit elements formed in known manner by electronic flip-flops or relays are performed by the supply of a positive switching voltage to the setting and resetting inputs respectively.

In the description of the operation of the storage circuit it is furthermore assumed that the forward tape movement is actually switched on. The button 3 is depressed, the contact 6 is closed, and the relay 1 is energized. Moreover, the contact 16 is closed and the direction storage 13 has a switching voltage at the output 19.

When during the forward tape movement the marking device becomes operative because the conductive marking foil closes the contacts of the device 8, a switching voltage is applied via the conductor 9 on the one hand to the relay 10 of the stop member and on the other hand to the input of the storage circuit.

The relay 10 thus energized causes through the connection 11 the depressed button 3 for the forward tape movement to be released. The contact 6 is reopened and the relay 1 is switched off. Owing to the inertia of the rotary masses in the gear of the apparatus, the tape moves on for a given time in the direction of the switched-off forward movement. In accordance with the length of the marking foil or in accordance with the speed with which the tape movement dies out the foil may either leave the tape contacts of the device 8 or keep them constantly in the closed state so that at the end of the runout in the first case the switching voltage is not available across the conductor 9 and in the second case it is still present there.

The marking signal applied to the storage circuit arrives at the setting input of the first bistable circuit element 24, which serves as a store for said signal. From the output of the first bistable circuit element 24 a switching voltage, produced at the changeover thereof, is applied to the input of the first signal delay member 25, at the output of which a switching voltage will appear only after the termination of the delay time *t*. This delay time *t* is at least equal to the longest runout time in the various modes of movement. The switching voltage from the output of the delay member 25 is applied to the setting input of the second bistable circuit element 26, which is thus not changed over the tape has come to a standstill. From the output of the second bistable circuit element 26 a switching voltage is applied to an input of the OR-gate 27, to the output of which is connected the switching member 12 via the conductor 22, which voltage, as a switching voltage, gets directly at the inputs of the two AND-gates 20, 21. A switching voltage is present at the output 19 of the direction storage 13 in accordance with the "forward" movement occurring prior to the standstill of the tape so that also at the output of the AND-gate 21 such a voltage occurs, the relay 2 being thus energized and the reverse tape movement being switched on. The AND-gate 20 remains out off because it does not receive a switching voltage from the direction storage.

It is supposed that the marking foil is short and has left the contacts for supplying the marking signal during the runout of the tape. Therefore, after the termination of the delay time *t*, at the instant of the actuation of the switching member 12 from the output of the OR-gate 27 the marking signal has disappeared from the conductor 9. The switching voltage from the output of the second bistable circuit element 26 is also applied to the setting input of the third bistable circuit element 28. As a result thereof a corresponding switching voltage is applied from the output of this third circuit element 28 to an input of the AND-gate 29, the second input of which is connected to the setting input of the first bistable circuit element 24. At the instant when the reverse movement is switched on no marking signal attends under the aforesaid conditions so that the AND-gate 29 is cut off. During the reverse tape movement the marking foil again attains the contacts of the deice 8 so that again the marking signal is produced. As a result the second input of the AND-gate 29 receives a switching voltage so that a switching voltage also appears at the output of this AND-gate 29. The latter is applied on the one hand to the reset input of the second bistable circuit element 26 and on the other hand to the second input of the OR-gate 27. The second bistable circuit element 26 is thus reset so that the switching voltage from its output for controlling the switching member via the OR-gate 27 disappears. However, since at this instant the OR-gate 27 receives at its second input from the AND-gate 29 the switching voltage producing the reset of the storage 26, first the control of the switching member and hence the active reverse movement is not interrupted. By resetting the second bistable circuit element 26 at the reoccurrence of the marking signal during the reverse tape movement the control of the reverse movement is therefore switched from one input of the OR gate to the second, the switching voltage controlling the reverse movement occurring at the output of the OR-gate 27 via the AND-gate 29 being thus directly derived from the marking signal.

When the marking foil leaves the contacts of the device 8 during the reverse movement and therefore the marking signal and hence the switching voltage controlling the switching member 12 disappear, the reverse movement is switched off.

Thus the switching-off cycle, i.e., stopping of the forward movement at the actuation of the tape marking in this direction of movement, runout of the tape movement, switching on of the reverse movement and finally switching off thereof at the disappearance of the signal supplied by the tape mark during the direction of movement opposite the first-mentioned movement, is achieved.

If it is assumed that the marking signal does not disappear transiently during the runout of the tape movement, but that it remains constantly operative during the switching-off cycle because the marking foil is longer than the runout distance of the tape, the operation described of the storage circuit is in principle the same. However, immediately at the appearance of the signal at the output of the third bistable circuit 28 resetting of the second store 26 and the control of the switching member are directly brought about by the marking signal. This is because the OR-gate 29 has received the marking signal already at the appearance of the switching voltage at the output of the bistable circuit element 28 so that the gate is opened.

It will be obvious that this measure results in that as soon as the tape movement is switched off by a tape mark the tape comes to a definite standstill always in a position such that viewed in the initial direction of tape movement the mark is located before the device causing the tape to be switched off. It is thus achieved that under any operational condition after an automatic interruption of a tape movement the apparatus is immediately ready for operation in the opposite direction of movement independently of the fact whether during the runout of the tape in the initial direction of travel the marking leaves or does not leave the device switching off the movement. In this way an absolute reliability in operation is achieved while in particular loosening of the tape from the supports and any subsequent manipulation for restarting the apparatus after having been switched off are avoided. This is particularly important for remote-controlled apparatus.

It will be apparent from the foregoing that at the end of the switching-off cycle the first and the third bistable circuit elements 24, 28 are in the position corresponding to the signals supplied to the storage via the setting inputs during the cycle. In order to have the storage circuit again ready for operation these two bistable circuit elements have to be reset to the initial position, so that a switching voltage has to be applied to their reset inputs. This is achieved by means of a resetting device 31.

In the embodiment shown in FIG. 1 this resetting device 31 for the storage circuit is simply formed by switches 32, 33, which can be actuated by the control members 3, 4 for switching on the modes of tape movements. By means of these switches 32, 33 the reset inputs of the storages 24, 28 are connected, when a mode of movement is switched on, across the conductor 30 to the voltage source 7, so that they are reset to their initial positions. Thus the storage circuit is again ready.

It has been found to be advantageous to provide the resetting device with a second signal delaying circuit 34, through which the resetting signal is applied to the two reset inputs of the bistable circuit elements 24 and 28. The delay time $t'$ of this second signal delaying member is chosen to be at least as long as the time interval between the response of the stop member and the instant of switching off the tape movement after the switching member has been actuated. In this way it is achieved that resetting of the storage circuit from the control members of the apparatus is only possible when an initiated switching-off has been completely performed.

Figure 2:
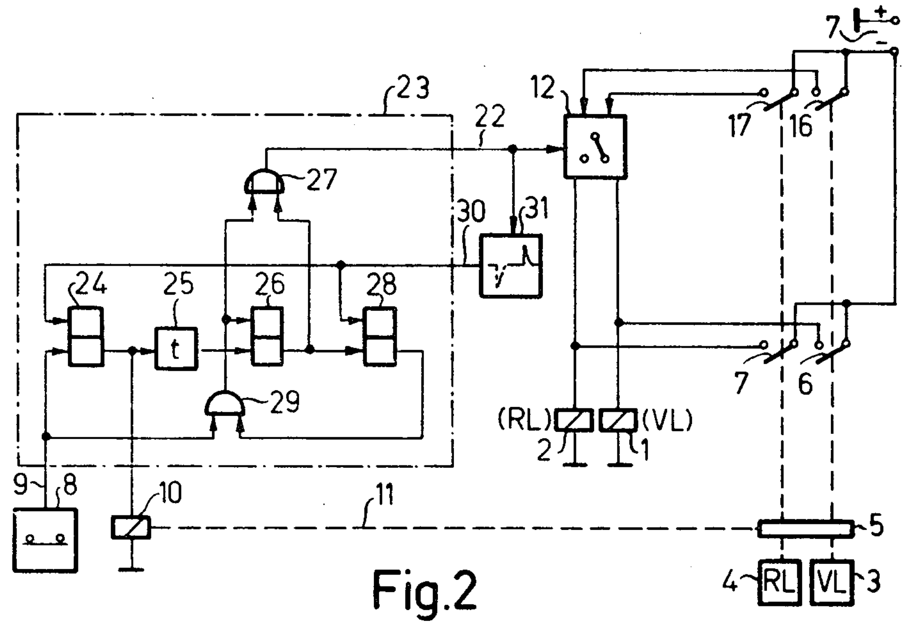
FIG. 2 shows a diagram of a second embodiment in which the storage circuit is reset automatically.

The embodiment shown in FIG. 2 comprises a resetting device 31 which performs automatically resetting of the storage circuit immediately at the termination of the switching-off cycle. For this purpose the resetting device 31 is formed by a differentiating circuit, the input of which is connected to the conductor 22 leading to the switching member 12. In this way the differentiating circuit receives the switching voltage causing the changeover of the direction of the tape movement, the disappearance of which voltage determines the end of the switching-off cycle. The differentiating circuit produces by this disappearance of the voltage a pulse which is applied subsequent to corresponding conversion via the conductor 30 to the reset inputs of the two bistable circuit elements 24 and 28.

In recording and/or playback apparatus it has often been found to be efficient to cause the stop member, when actuated, to prevent switching on of a mode of tape movement by mechanical or electrical agency so that during its operation no other mode of movement can be switched on. In such apparatus in which the measures in accordance with the invention are applied, it has been found to be particularly advantageous to connect the stop member 10 to the output of the first bistable circuit element 24 of the storage circuit as is shown in FIG. 2. Since a switching voltage is available at the output of this bistable circuit element for the whole duration of a switching-off cycle, the stop member is operative for said period of time so that during the performance of a cycle any switching of any mode of movement by the control members of the apparatus is not possible. The further mode of operation of this embodiment is analogous to that of the embodiment shown in FIG. 1.

Obviously numerous modifications of the aforesaid embodiments may be designed within the scope of the invention. This applies particularly to the manner in which the storage circuit cooperates with the further parts of the apparatus in accordance with their structure.

What is claimed is:

1. A reversing apparatus for a motor-driven recording and playback device using a record carrier provided with at least one mark, comprising sensing means adjacent the record carrier for providing a signal in response to the movement of the mark passed the sensing means, cutoff means connected to the sensing means for removing power from the motor in response to the signal from the sensing means, directional control means for recording the direction of motion of the record carrier and for providing an output signal corresponding to the opposite direction of motion, and a storage circuit having an input connected to the sensing means and having an output connected to the directional control means for providing a signal enabling the directional control means to rotate the motor in the direction opposite the last direction of motion thereof a predetermined period of time after a signal from the sensing means, the storage circuit comprising a first bistable multivibrator switchable to a first stable state in response to a signal on a set input thereof and switchable to a second stable state in response to a signal on a reset input thereof for providing an output corresponding to the first stable state thereof, means for connecting the set input of the first multivibrator to the output of the sensing means whereby the first bistable multivibrator is set to a first stable state in response to the motion of the mark on the record carrier passed the sensing means, a delay device connected to the output of the first bistable multivibrator for providing an output corresponding to the output of the first multivibrator delayed by a period sufficient for the momentum of the recording apparatus to be dissipated after power to the motor thereof is removed, a second bistable multivibrator switchable to a first stable state in response to a signal on a set input thereof and setable to a second stable state in response to a signal on a reset input thereof for providing an output corresponding to the first stable state, means for connecting the output of the delay device to the set input of the second multivibrator, an OR gate having an input connected to the output of the second bistable multivibrator and having an output connected to the directional control means whereby the enabling signal is provided, a third bistable multivibrator switchable to a first stable state in response to a signal on a set input thereof and switchable to a second stable state in response to a signal on a set input thereof and switchable to a second stable state in response to a signal on a reset input thereof for providing an output in response to the first stable state, an AND gate having an input connected to the output of a third bistable multivibrator, means for connecting the output of the sensing means to a second input of the AND gate, means for connecting the output of the AND gate to the reset input of the second bistable multivibrator and to a second input of the OR gate, and resetting means connected to the reset inputs of the first and third bistable multivibrator for providing reset signals thereto.

2. An apparatus as claimed in claim 1, wherein the resetting means comprises switches controllable by control members for switching on the modes of record carrier movements, through which switches a switching voltage as a resetting signal is applied to the resetting inputs of the first and third bistable circuit elements, and a second signal-delaying circuit having a delay time at least equal to the time interval between the response of the cutoff means and the instant of switching off the record carrier movement after actuation of the directional control member.

3. An apparatus as claimed in claim 1 wherein the resetting means comprises a differentiating circuit whose input is connected to the output of the OR gate, the output of said circuit supplying as a resetting signal a pulse at the termination of the actuation of the switching member.

4. An apparatus as claimed in claim 3, wherein the cutoff means is connected to the sensing means through the output of the first multivibrator, and further comprising means connected to the cutoff means for preventing manual interference with the operation of the recording device motor during the operation of the apparatus.

* * * * *

PO-1050
(5/69)

UNITED STATES PATENT OFFICE
CERTIFICATE OF CORRECTION

Patent No. 3,636,761 Dated January 25, 1972

Inventor(s) HERMAN BRETSCHNEIDER, VIKTOR CZONKA and KARL RUPP

It is certified that error appears in the above-identified patent and that said Letters Patent are hereby corrected as shown below:

Col. 4, line 37, "deice" should be --device--;

IN THE CLAIMS

Claim 1, line 40, delete "and switchable to a second stable"

line 41, delete "state in response to a signal on a set input thereof"

Signed and sealed this 10th day of October 1972.

(SEAL)
Attest:

EDWARD M.FLETCHER,JR.
Attesting Officer

ROBERT GOTTSCHALK
Commissioner of Patents